United States Patent [19]

Feder

[11] Patent Number: 5,145,901
[45] Date of Patent: * Sep. 8, 1992

[54] AQUEOUS DISPERSIONS OF CROSSLINKABLE SILICONES/ALKENYLOXYSILANES

[75] Inventor: Michel Feder, Illfurth, France

[73] Assignee: Rhone-Poulenc Chimie, Courbevoie, France

[*] Notice: The portion of the term of this patent subsequent to Sep. 5, 2006 has been disclaimed.

[21] Appl. No.: 419,719

[22] Filed: Oct. 11, 1989

[30] Foreign Application Priority Data

Oct. 11, 1988 [FR] France ............................ 88 13618

[51] Int. Cl.⁵ ............................ C08K 3/26; C08K 3/22
[52] U.S. Cl. .................................... 524/424; 524/425; 524/432; 524/433; 524/435; 524/436; 524/437; 524/449; 524/451; 524/457; 525/104; 525/106
[58] Field of Search ............... 524/457, 424, 425, 432, 524/433, 435, 436, 437, 449, 451; 525/104, 106

[56] References Cited

U.S. PATENT DOCUMENTS 4,608,412  8/1986  Freiberg .
4,695,617  9/1987  Inoue et al. .
4,704,422  11/1987 Bakken .
4,721,766  1/1988  Inoue et al. ........................ 524/765
4,769,412  9/1988  Inoue et al. ........................ 524/785
4,816,506  3/1989  Gamon et al. .
4,863,985  9/1989  Puchol et al. ...................... 524/588

FOREIGN PATENT DOCUMENTS 0266729  5/1988  European Pat. Off. .

Primary Examiner—Joseph L. Schofer
Assistant Examiner—Jeffrey T. Smith
Attorney, Agent, or Firm—Burns, Doane, Swecker & Mathis

[57] ABSTRACT

Aqueous dispersions of a silicone crosslinkable into elastomeric state by elimination of water therefrom, include:

(A) 100 parts of an oil-in-water emulsion of an $\alpha,\omega$-(dihydroxy)polydiorganosiloxane, stabilized with an anionic and/or nonionic surfactant;
(B) 0.1 to 20 parts of an alkenyloxysilane;
(C) 0.01 to 3 parts of a metal curing catalyst; and
(D) 0 to 250 parts of a nonsiliceous inorganic filler material;

and such emulsion having a pH of from 7 to 13 and a solids content of at least 40%; the subject emulsions are especially adapted for the production of paints and of silicone elastomer seals, and for the coating of pharmaceuticals, agricultural chemicals and food packaging materials.

13 Claims, No Drawings

AQUEOUS DISPERSIONS OF CROSSLINKABLE SILICONES/ALKENYLOXYSILANES

CROSS-REFERENCE TO COMPANION APPLICATION

Copending application Ser. No. 07/419,701 now U.S. Pat. No. 5,004,771, , filed concurrently herewith and assigned to the assignee hereof.

BACKGROUND OF THE INVENTION

1. Field of the Invention

The present invention relates to novel aqueous dispersions of an alkenyloxysilane-based silicone, which novel dispersions are crosslinkable into elastomeric state by elimination of water therefrom.

2. Description of the Prior Art

U.S. Pat. No. 2,891,920 describes a process for emulsion polymerization of polydiorganosiloxanes utilizing an acidic or basic catalyst in the presence of anionic, cationic or nonionic surface-active agents. The '920 patent relates that the emulsions obtained are stable in storage and, after addition of fillers, can be used to formulate paints for providing continuous coatings by elimination of water therefrom.

U.S. Pat. No. 3,294,725 describes, in particular, the use of dodecylbenzenesulfonic acid to polymerize polydiorganosiloxanes in emulsion. This '725 patent observes that to obtain stable emulsions it is desirable to adjust the pH of such emulsions to a value of approximately 7. It also relates that an elastomeric coating can be obtained from these neutralized emulsions, to which colloidal silica and a polyalkoxysilane have been added.

U.S. Pat. No. 3,360,491 is similar to the '725 patent, except that dodecylbenzenesulfonic acid is replaced with lauryl hydrogen sulfate.

U.S. Pat. No. 3,697,469 describes a particular process for emulsion polymerization of polydiorganosiloxanes and indicates the possibility of adding colloidal silica and a tin salt to the emulsion in order to provide an elastomeric coating by water evaporation.

French Patent FR-A-2,110,358 describes a silicone emulsion having a pH of between 6.5 and 9, crosslinking to an electrically conductive elastomer after evaporation of water and incorporating carbon black. The emulsion, additionally containing a tin salt and a polyalkoxysilane, is not stable in storage and must be stored in two separate packages (two-component emulsion).

U.S. Pat. Nos. 4,221,688 and 4,244,849 and French Patent FR-A-2,463,163 describe storage-stable silicone emulsions comprising:
  (i) an anionically stabilized emulsion of an $\alpha,\omega$-(dihydroxy)polydiorganosiloxane;
  (ii) a siliceous filler;
  (iii) a tin salt; and
  (iv) optionally, a nonreinforcing filler.

The siliceous filler may be a colloidal silica (U.S. Pat. No. 4,221,688), sodium silicate (U.S. Pat. No. 4,244,849) or an amorphous silica powder (FR-A-2,463,163).

In comparison with the known aqueous emulsions (dispersions) of the prior art, these three patents offer, on the one hand, that to obtain a storage-stable single-component emulsion, the emulsion must be stored at an alkaline pH higher than 8.5 or 9, preferably higher than 10 and, on the other hand, a tin salt must be incorporated in the emulsion to shorten to a few days the emulsion ripening or aging stage required to provide a crosslinkable dispersion.

U.S. Pat. No. 3,355,406 describes a silicone latex of an $\alpha,\omega$-(dihydroxy)polydiorganosiloxane, preferably prepared by emulsion polymerization, and of a sesquisiloxane resin including $RSiO_{1.5}$ recurring units (R=hydrocarbon residue). The latex may additionally comprise a metal curing catalyst and an alkyltrialkoxysilane.

In U.S. Pat. No. 4,554,187 the silicone resin used in combination with the $\alpha,\omega$-(dihydroxy)polydiorganosiloxane is a reactive resin of low molecular weight, containing alkoxy or acyloxy groups.

In Patent Application EP-A-266,729 the silicone resin used in combination with the $\alpha,\omega$-(dihydroxy)polydiorganosiloxane and with the curing catalyst is a siliconate.

A silicone resin comprising up to 10% by weight of hydroxyl groups may be used in combination with this siliconate.

U.S. Pat. No. 4,618,642 describes an aqueous dispersion of a silicone comprising a nonsiliceous filler and an alkoxysilane or a ketiminoxysilane. According to U.S. Pat. No. 4,608,412, an alkyl orthosilicate can also be employed.

The use of an alkoxysilane in combination with a siliceous filler is described, furthermore, by U.S. Pat. No. 4,618,645.

Alkenyloxysilanes are known compounds, described in particular by FR-A-1,439,013, the combined use of which with an $\alpha,\omega$-(dihydroxy)diorganopolysiloxane and a curing catalyst, in the absence of atmospheric moisture, provides a single-component composition which is stable in storage in the absence of water and which crosslinks into an elastomer in the presence of atmospheric moisture, as per U.S. Pat. No. 3,819,563.

However, U.S. Pat. No. 3,819,563 neither describes nor suggests that the silicone composition may be in the form of an aqueous dispersion.

Furthermore, the literature pertaining to aqueous silicone dispersions does not describe the use of alkenyloxysilane in combination with an aqueous emulsion of an $\alpha,\omega$-(dihydroxy)diorganopolysiloxane and a metal curing catalyst.

SUMMARY OF THE INVENTION

Accordingly, a major object of the present invention is the provision of novel aqueous silicone dispersions which are stable in storage, and which properly crosslink sufficiently quickly into an elastomer by elimination of water therefrom at ambient temperature, the elastomer formed retaining its mechanical properties upon aging thereof.

Another object of the present invention is the provision of novel aqueous silicone dispersions of the above type, the ripening of which can be carried out at a relatively low temperature (20° to 60° C.) and for a period of less than 48 hours.

Another object of the present invention is the provision of novel aqueous silicone dispersions of the above type, ultimately providing an elastomer additionally exhibiting an improved flame resistance.

Yet another object of this invention is the provision of novel aqueous silicone dispersions of the above type that are crosslinkable into elastomers exhibiting satisfactory adhesiveness to a variety of substrates, in particular to glass, concrete and metals (steel, aluminum, etc.).

Briefly, the present invention features novel aqueous dispersions of a silicone that are crosslinkable into elastomeric state by elimination of water therefrom under ambient conditions, said novel characterized aqueous dispersions comprising:

(A) 100 parts by weight of an oil-in-water type emulsion of an α,ω-(dihydroxy)polydiorganosiloxane, stabilized with at least one surface-active agent selected from among anionic and nonionic surface-active agents and mixtures thereof;

(B) 0.1 to 20 parts by weight of an alkenyloxysilane of the formula:

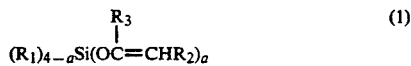

$$(R_1)_{4-a}Si(OC=CHR_2)_a \quad (1)$$

in which $R_1$, $R_2$ and $R_3$, which may be identical or different, are each a monovalent hydrocarbon radical containing from 1 to 12 carbon atoms, with the proviso that $R_2$ may be a hydrogen atom;

(C) 0.01 to 3 parts by weight of a metal curing catalyst compound; and (D) 0 to 250 parts by weight of a nonsiliceous inorganic filler material;

and said dispersions having a pH higher than 7, preferably ranging from 8 to 13, and a solids content of at least 40%.

DETAILED DESCRIPTION OF THE PREFERRED EMBODIMENTS OF THE INVENTION

More particularly according to the present invention, the α,ω-(dihydroxy)polydiorganosiloxanes must have a viscosity of at least 100 mPa.s at 25° C., preferably of at least 50,000 mPa.s.

Indeed, an elastomer is in fact obtained in the case of viscosities higher than 50,000 mPa.s, exhibiting a combination of appropriate mechanical properties, in particular with regard to Shore A hardness and elongation.

Furthermore, the higher the viscosity, the more the mechanical properties are retained as the elastomer ages.

According to the present invention, the preferred viscosities range from 50,000 to 1,500,000 mPa.s at 25° C.

The organic radicals of the α,ω-(dihydroxy)polydiorganosiloxanes are monovalent hydrocarbon radicals containing up to 6 carbon atoms, optionally substituted by cyano or fluoro groups. The substituents generally incorporated because of their availability in industrial products, are methyl, ethyl, propyl, phenyl, vinyl and 3,3,3-trifluoropropyl radicals. In general, at least 80% of the number of such radicals are methyl radicals.

The preferred polymers according to the present invention are the α,ω-(dihydroxy)polydiorganosiloxanes prepared by the anionic polymerization process described in the aforementioned U.S. Pat. Nos. 2,891,920 and, especially, 3,294,725. The polymer obtained is stabilized anionically with a surface-active agent which, as per U.S. Pat. No. 3,294,725 is preferably the alkali metal salt of an aromatic hydrocarbon sulfonic acid, the free acid also serving as a polymerization catalyst.

The preferred catalyst and surface-active agent are dodecylbenzenesulfonic acid and its alkali metal salts, in particular its sodium salt. Other anionic or nonionic surface-active agents may be added, if desired. However, this addition is unnecessary because, according to U.S. Pat. No. 3,294,725, the amount of anionic surface-active agent resulting from the neutralization of the sulfonic acid is sufficient to stabilize the polymer emulsion. This amount is generally less than 3%, preferably 1.5% of the weight of the emulsion.

This emulsion polymerization process is particularly advantageous because it enables the emulsion (A) to be directly produced. Furthermore, this process offers the ability to produce α,ω-(dihydroxy)polydiorganosiloxane emulsions (A) of very high viscosity without difficulty.

To prepare the emulsion (A), it is also possible to begin with an already polymerized α,ω-(dihydroxy)polydiorganosiloxane and to then convert it into an aqueous emulsion by stabilizing the emulsions with an anionic and/or nonionic surface-active agent according to a process which is well known to this art and described in detail in the literature (see, for example, FR-A-2,064,563, FR-A-2,094,322, FR-A-2,114,230 and EP-A-169,098).

According to this process, the α,ω-(dihydroxy)polydiorganosiloxane polymers are mixed merely by stirring them with the anionic or nonionic surface-active agent, it being possible for the latter to be in aqueous solution. Then water is added, if necessary, and the entire mixture is converted into a fine and homogeneous emulsion by passing same through a conventional colloid mill.

The millbase obtained is then diluted with an appropriate amount of water and an emulsion (A) stabilized with an anionic or nonionic surface-active agent and stable in storage is thus obtained.

The amount of anionic and nonionic surface-active agent which can be employed is that commonly employed in the emulsification process, in particular those described in the aforementioned patents and in U.S. Pat. No. 2,891,920.

According to the present invention, the preferred anionic surface-active agents are the alkali metal salt of an aromatic hydrocarbon sulfonic acid and the preferred nonionic surface-active agents are polyoxyethylenated alkylphenols. These nonionic surface-active agents are, of course, the same as those which can be optionally added to the emulsions (A) produced by emulsion polymerization as indicated earlier.

The emulsion (A) prepared by emulsion polymerization or by emulsification of the silicone polymer is in the form of an oil-in-water emulsion and preferably has a solids content higher than 45% by weight.

From 0.1 to 20 parts, preferably from 0.5 to 10 parts, of alkenyloxysilane (B) of formula (1) are incorporated per 100 parts of emulsion (A).

In formula (I) the monovalent hydrocarbon radicals $R_1$, $R_2$ and $R_3$ are preferably linear or branched chain alkyl radicals containing from 1 to 12 carbon atoms, preferably from 1 to 6 carbon atoms, and vinyl and phenyl radicals $R_1$ is preferably a methyl, vinyl or phenyl radical, $R_3$ is preferably a methyl radical, and $R_2$ is preferably a hydrogen atom.

Exemplary of the silanes (B), particularly representative are methyltri(isopropenyloxy)silane, vinyltri(isopropenyloxy)silane, phenyltri(isopropenyloxy)silane, n-propyltri(isopropenyloxy)silane, tetra(isopropenyloxy)silane, methyltri(1-phenyl-1-ethenyloxy)silane, methyltri(1,2-dimethyl-1-propenyloxy)silane and methyltri(1,4-dimethyl-1,3-pentadienyloxy)silane.

The silanes (B) and their partial hydrolysis products serve as crosslinking agents in the aqueous silicone dispersions according to the invention.

The metal curing catalyst compounds (C) are essentially the carboxylic acid salts and the halides of metals selected from among lead, zinc, zirconium, titanium, iron, tin, barium, calcium and manganese.

The constituent (C) is preferably a tin catalyst compound, generally an organotin salt, preferably introduced in the form of an aqueous emulsion. The organotin salts which can be employed are described, in particular, in the text by Noll, *Chemistry and Technology of Silicones*, page 337, Academic Press (1968).

The tin catalyst compound employed may also be the product of reaction of a tin salt, in particular of a tin dicarboxylate with ethyl polysilicate, as described in U.S. Pat. No. 3,862,919.

It is also possible to use the product of reaction of an alkyl silicate or of an alkyltrialkoxysilane with dibutyltin diacetate, as described in Belgian Patent BE-A-842,305.

The preferred tin salts are tin bischelates (EP-A-147,323 and EP-A-235,049), diorganotin dicarboxylates and in particular dibutyl- or dioctyltin diversatates (British Patent GB-A-1,289,900), dibutyl- or dioctyltin diacetate and dibutyl- or dioctyltin dilaurate. From 0.01 to 3 parts, preferably from 0.05 to 2 parts, of organotin salt are employed per 100 parts of (A).

Another constituent of the dispersion according to the invention is the addition of 0 to 250 parts, preferably of 5 to 200 parts, of a nonsiliceous semireinforcing or packing inorganic filler (D).

The fillers (D) have a particle size which generally ranges from 0.001 to 300 $\mu$m and a BET surface area lower than 100 m$^2$/g.

Examples of fillers (D) which can be employed either alone or in admixture are: carbon black, titanium dioxide, aluminum oxide, hydrated alumina, expanded vermiculite, unexpanded vermiculite, calcium carbonate, zinc oxide, mica, talc, iron oxide, barium sulfate and slaked lime.

These fillers (D) are introduced into the emulsion (A) in dry powder form, for example merely by mixing.

According to an alternative embodiment of the invention, it has been found that if the filler (D) is substantially only a filler selected from among hydrated alumina, expanded vermiculite, or unexpanded vermiculite, in a proportion of 5 to 250 parts, preferably of 10 to 200 parts, per 100 parts of emulsion (A), then an elastomer is obtained having a flame resistance which is particularly high and which cannot be obtained with the other of the above-mentioned categories of filler (D), in particular with aluminum oxide or unhydrated alumina. Ceramic or aramid fibers, as described in EP-A-212,827, may also be incorporated.

In another embodiment of the invention, it is possible additionally to incorporate, per 100 parts of emulsion (A), a siliceous additive (E) selected from among sodium silicate (0.3 to 30 parts), and a reinforcing or semireinforcing siliceous filler (1 to 150 parts).

These siliceous fillers are selected from among colloidal silica, pyrogenic and precipitated silica powders or a mixture thereof. Pyrogenic silica is preferred. It is also possible, however, to employ semireinforcing siliceous fillers such as diatomaceous earths or ground quartz.

The sum of the parts of (D) +(E) must be less than 300 parts per 100 parts of emulsion (A).

Pyrogenic and precipitated silica powders are well known; they are employed, in particular, as fillers in silicone elastomer compositions capable of being vulcanized when heated and a silicone rubber. These powders have a mean particle size which is generally below 0.1 $\mu$m and a BET specific surface area higher than 50 m$^2$/g, preferably ranging from 150 to 350 m$^2$/g.

The incorporation of this siliceous additive (E) in the emulsion (A) by any suitable means, in particular by stirring, considerably increases the viscosity of the emulsion (A), which is then pasty in character.

Indeed, it has now been found that the addition of this siliceous additive (E) is sufficient to impart a more or less pronounced "thixotropic" character to the dispersion. When removed from, for example, a storage cartridge, the emulsion adheres without flowing, even to a vertical substrate, and cures into elastomeric state by evaporation of water at ambient temperature. A nonflowing emulsion can also be obtained by employing as a filler (D) calcium carbonate whose mean particle diameter is smaller than 0.1 $\mu$m. Slight heating (to approximately 40 to 80 C) of the composition, to accelerate water evaporation, is also within the ambit of the present invention.

In addition, from 1 to 40 parts, preferably from 2 to 20 parts, of a hydroxylated silicone resin (F), calculated as the solids content, may be incorporated per 100 parts of emulsion (A).

The hydroxylated silicone resin (F) has a weight content of hydroxyl groups of from 0.1 to 10%, preferably from 1 to 6%.

This resin (F) contains, per molecule, at least two different recurring units selected from among those of the formulae: $R_3SiO_{0.5}$ (M unit), $R_2SiO$ (D unit), $RSiO_{1.5}$ (T unit) and $SiO_2$ (Q unit).

The M, D, T and Q units are distributed such as to provide a molar ratio R/Si lower than 2, preferably lower than 1.8, to exclude linear polydiorganosiloxanes.

The radicals R, which may be identical or different, are each a vinyl, phenyl or 3,3,3-trifluoropropyl radical, or a linear or branched chain alkyl radical containing from 1 to 6 carbon atoms.

Methyl, ethyl, isopropyl, tert-butyl and n-hexyl radicals are exemplary of the alkyl radicals R.

These silicone resins are well known branched organopolysiloxane polymers, the processes for the preparation of which are widely described in the patent literature.

MQ resins, MQD resins, TD resins and MDT resins are representative examples of resins which can thus be employed.

Resins which are solid or liquid at ambient temperature can be used. These resins can be incorporated in the aqueous emulsions as such, in solution in an organic solvent or a silicone oil, or else in the form of aqueous emulsions.

Aqueous emulsions of silicone resins which can be employed are described, for example, in U.S. Pat. Nos. 4,028,339, 4,052,331, 4,056,492, 4,525,502 and 4,717,599.

In a preferred embodiment of the invention, the adhesiveness of the elastomers resulting from the subject dispersions to various substrates can be greatly improved by adjusting the pH of the dispersion to a value of from 8 to 13 by adding an adapted amount of an aqueous solution of a strong inorganic base (G) selected from among alkali metal or alkaline earth metal hydroxides such as sodium hydroxide, potassium hydroxide, calcium hydroxide, magnesium hydroxide and barium hydroxide.

Antifungal and antimoss agents, as well as agents imparting thixotropy, such as carboxymethyl cellulose, xanthan gum and polyvinyl alcohol, are other examples of additives which may be incorporated in the dispersions according to the invention.

The dispersions according to the invention can be prepared in the following manner:

The starting material is an emulsion (A) prepared either by the emulsion polymerization process, and an emulsion stabilized by an anionic or optionally nonionic surface-active agent is produced, or by the process of emulsifying the α,ω-(dihydroxy)polydiorganosiloxane, and an emulsion stabilized by an anionic and/or nonionic surface-active agent is produced.

To prepare the dispersions according to the invention, it is recommended to first adjust, at ambient temperature, the pH of the emulsion (A) to a value of from 7 to 13, preferably from 8 to 13, using an organic base (for example diethylamine) or an inorganic base [additive (G)]. The additive (G) is preferred because it makes it possible to obtain an elastomer which adheres better to the substrates.

The catalyst (C), followed by the silane (B) and optionally the filler (D) and (E) as well as the resin (F) are then added.

The resin (F) is added as such or in solution in an organic solvent or in a silicone oil, or else in the form of an aqueous emulsion.

A trimethylsilyl-blocked polydimethylsiloxane having a viscosity of from 100 to 5,000 mPa.s at 25° C. may be employed as a silicone oil.

The final emulsion obtained is homogenized and then degassed and is next packaged in a package which is impervious to atmospheric oxygen and to water vapor.

The constituents (A), (B), (C) and, if desired, (D), (E), (F) and (G) are mixed in such amounts that the final emulsion has a solids content which is higher than 40%, preferably higher than 60%, but generally lower than 90%. The preferred pH range is from 8 to 13.

The dispersions according to the invention may be employed as a paint which can be crosslinked into thin layer form. They then preferably have a solids content of from 40% to 70%.

To determine the solids content, 2 g of dispersion are placed in an aluminum weighing dish, which is heated to 150° C. for one hour in an oven with air circulation. After cooling, the dish is weighed again and the percentage of material remaining from the initial 2 g is determined, representing the solids content.

In a preferred embodiment of the invention, after being prepared, the dispersion is subjected to a ripening stage at ambient temperature, of a few hours to a few days.

This ripening stage entails merely permitting the dispersion to stand protected against atmospheric oxygen before it is used.

The dispersions according to the invention can be employed for producing silicone elastomer seals, in particular for the building and construction industry.

These dispersions can also be employed for coating various pharmaceutical or plant-protective active substances formulated in a solid form (pellets, tablets, pills and the like), for sealing corks used for sealing wine and spirit bottles, to produce coatings of kitchen articles and, generally, of articles in contact with foodstuffs (for example, bread pans).

Known coating methods can be employed, in particular the methods of brush- and dip-(immersion)coating, spraying techniques, fluidized-bed coating techniques and immersion-coating techniques.

In the case of cork coatings, a recommended technique is the dripping technique, which comprises immersing the corks in the dispersion, which wets the surface of the corks, and then evaporating off the water.

The coating obtained represents 20 to 50 mg of elastomer per 100 cm2 of cork surface area. This layer makes it easier for the cork to slide into the neck of the bottle during the bottling and prevents "running", that is to say, leakages of liquid between the neck and the cork.

In order to further illustrate the present invention and the advantages thereof, the following specific examples are given, it being understood that same are intended only as illustrative and in nowise limitative.

In said examples to follow, all parts and percentages are given by weight, unless otherwise indicated.

EXAMPLE 1

Preparation of Emulsion (A)

This emulsion was prepared by emulsion polymerization of an α,ω-(dihydroxy)polydimethylsiloxane oil having a viscosity of 100 mPa.s at 25° C. in the presence of dodecylbenzenesulfonic acid. When the oil viscosity reached $10^6$ mPa.s at 25° C., the polymerization was terminated by neutralizing the catalyst.

The emulsion (A) obtained had a solids content of 59%.

To 100 parts of the emulsion (A), there were then added, with stirring, 2.2 parts of a 30% strength aqueous solution of potassium hydroxide (G) followed by 1.5 parts of aqueous emulsion (C) containing 37% by weight of di-n-octyltin dilaurate, 4.1 parts of methyltri(isopropenyloxy)silane (B) and 37 parts of powdered precipitated $CaCO_3$ (D) having a mean particle size of 70 nanometers.

The constituents (A), (B), (C), (D) and (G) were added in the order shown, at ambient temperature, and with an incorporation period of approximately 15 minutes having been permitted for each reactant.

The final emulsion had a solids content of 70% and directly exhibited a pH of 10.

The final dispersion was homogenized for 30 minutes and was then packaged in a packaging material which was impervious to atmospheric oxygen and to water vapor.

After 7 days of storage, the dispersion was spread with a doctor blade to form a 2-mm thick film which was permitted to dry for 7 days at ambient temperature (20°) in the case of a first batch and for 2 months at ambient temperature in the case of a second batch.

The following mean mechanical properties were measured on the dried films:

(a) Shore A hardness (SAH) according to ASTM standard D-2240;

(b) tensile strength (TS) according to AFNOR standard T 46 002, corresponding to ASTM standard D 412, in MPa;

(c) elongation at break (EB) in % according to AFNOR standard T 46 002;

(d) the elasticity modulus (EM) at 100% elongation, according to AFNOR standard T 46 002, in MPa.

The mechanical properties obtained are reported in the Table below.

To assess the adhesiveness, a 4-mm thick bead of aqueous dispersion was deposited onto a glass or concrete support. After 12 days, the adhesiveness of the elastomer formed was assessed by pulling the bead by hand.

The adhesions were qualified in three ways:

(1) good adhesiveness, when the bead cannot be separated from its support (indicated as ++);

(2) average adhesiveness, when the bead was separated with difficulty and in small areas (indicated as +); and (3) absence of adhesiveness, when the bead separated easily (indicated as 0).

The mechanical properties and the assessments of adhesion are reported in the Table below.

EXAMPLE 2

The operating procedure of Example 1 was repeated exactly, except that 1.2 parts of diethylamine were added instead of 2.2 parts of potassium hydroxide.

The pH of the final dispersion was 9.

The final emulsion had a solids content of 71%.

The mechanical properties and the assessments of adhesion are reported in the Table below.

TABLE

| EXAMPLES | | 1 | 2 |
|---|---|---|---|
| SAH | 7 days at 20° C. | 12 | 17 |
| | 2 months at 20° C. | 22 | 31 |
| TS (MPa) | 7 days at 20° C. | 0.62 | 0.90 |
| | 2 months at 20° C. | 0.73 | 0.84 |
| EB (%) | 7 days at 20° C. | 1,600 | 964 |
| | 2 months at 20° C. | 822 | 609 |
| EM (MPa) | 7 days at 20° C. | 0.17 | 0.33 |
| | 20 months at 20° C. | 0.29 | 0.47 |
| GLASS ADHESIVENESS | | ++ | 0 |
| CONCRETE ADHESIVENESS | | + | 0 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter which comprises an aqueous dispersion of a silicone crosslinkable into elastomeric state by elimination of water therefrom under ambient conditions, said silicone dispersion comprising:

(A) 100 parts by weight of an oil-in-water emulsion of an α,ω-(dihydroxy)polydiorganosiloxane, stabilized with at least one anionic or nonionic surface-active agent, or admixture thereof;

(B) 0.1 to 20 parts by weight of an alkenyloxysilane of the formula:

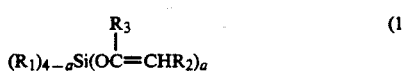

(1)

in which $R_1$, $R_2$ and $R_3$, which may be identical or different, are each a monovalent hydrocarbon radical containing from 1 to 12 carbon atoms, with the proviso that $R_2$ may be a hydrogen atom:

(C) 0.01 to 3 parts by weight of a metal curing catalyst compound; and (D) 0 to 250 parts by weight of a nonsiliceous inorganic filler material;

and said dispersion having a pH higher than 7 and a solids content of at least 40%.

2. The aqueous silicone dispersion as defined by claim 1, said metal curing compound (C) comprising an organotin salt (D), in the form of an aqueous emulsion thereof.

3. The aqueous silicone dispersion as defined by claim 1, said emulsion (A) having a solids content of at least 45% by weight.

4. The aqueous silicone dispersion as defined by claim 1, comprising from 5 to 200 parts by weight of said filler material (D).

5. The aqueous silicone dispersion as defined by claim 4, said filler material (D) comprising hydrated alumina, alumina, calcium carbonate, expanded vermiculite, unexpanded vermiculite, carbon black, zinc oxide, titanium dioxide, mica, talc, iron oxide, barium sulfate or slaked lime.

6. The aqueous silicone dispersion as defined by claim 5, comprising a calcium carbonate having a mean particle diameter smaller than 0.1 μm.

7. The aqueous silicone dispersion as defined by claim 1, comprising:

(A) 100 parts of an oil-in-water emulsion of an α,ω-(dihydroxy)polydiorganosiloxane having a viscosity of from 50,000 to 1,500,000 mPa.s at 25° C., stabilized with an alkali metal salt of an aromatic hydrocarbon sulfonic acid or a polyoxyethylenated alkylphenol;

(B) 0.5 to 10 parts of the alkenyloxysilane;

(C) 0.05 to 2 parts of a diorganotin dicarboxylate; and (D) 10 to 200 parts of an inorganic filler material;

and said emulsion having a pH of from 8 to 13 and a solids content of at least 60%.

8. The aqueous silicone dispersion as defined by claim 1, further comprising, per 100 parts of the emulsion (A), a siliceous additive (E) which comprises sodium silicate or a reinforcing or semireinforcing siliceous filler, with the proviso that the sum of the parts of (D)+(E) is less than 300 parts per 100 parts of (A).

9. The aqueous silicone dispersion as defined by claim 1, further comprising, per 100 parts of emulsion (A), 1 to 40 parts by weight of a hydroxylated silicone resin (F) containing at least two different recurring units per molecule, said recurring units including those of the formulae: $R_3SiO_{0.5}$, $R_2SiO$, $RSiO_{1.5}$ and $SiO_2$, in which the radicals R, which may be identical or different, are each a vinyl, phenyl or 3,3,3-trifluoropropyl radical, or a linear or branched chain alkyl radical containing from 1 to 6 carbon atoms, and said resin having a weight content of hydroxyl groups ranging from 0.1% to 10%.

10. The aqueous silicone dispersion as defined by claim 1, further comprising an aqueous solution of an alkali or alkaline earth metal hydroxide.

11. The aqueous silicone dispersion as defined by claim 1, in cured elastomeric state.

12. A substrate coated with the aqueous silicone dispersion as defined by claim 1.

13. The coated substrate as defined by claim 12, said substrate comprising a pharmaceutical or agricultural chemical, a food wrapping material, or a cork item.

* * * * *